United States Patent [19]

Botton

[11] Patent Number: 4,642,071

[45] Date of Patent: Feb. 10, 1987

[54] TOOTHED BELT DRIVE BETWEEN OBLIQUE SHAFTS

[76] Inventor: Guilio Botton, Via Giambellino 44, 20146 Milano, Italy

[21] Appl. No.: 747,105

[22] Filed: Jun. 20, 1985

[51] Int. Cl.⁴ .............................................. F16H 7/00
[52] U.S. Cl. ..................................................... 474/63
[58] Field of Search ............................. 474/61, 62, 63

[56] References Cited

U.S. PATENT DOCUMENTS

| | | | |
|---|---|---|---|
| 3,365,966 | 1/1968 | Heyer | 474/62 |
| 3,685,098 | 8/1972 | Lapeyre | 474/62 X |
| 3,696,681 | 10/1972 | Fetter et al. | 474/62 X |
| 3,776,052 | 12/1973 | Campbell, Jr. | 474/63 X |
| 3,821,906 | 7/1974 | Berg | 474/62 |

*Primary Examiner*—James A. Leppink
*Assistant Examiner*—Frank H. McKenzie, Jr.
*Attorney, Agent, or Firm*—Karl F. Ross; Herbert Dubno

[57] ABSTRACT

A pair of reaction and guide roller are located between the toothed gears of two oblique shafts and act on the back of two branches of a toothed belt driving the gears, the axis of each roller being positioned at a substantially intermediate angularity with respect to the direction of the two shafts of the one and of the other toothed gear and being lined up with the axis of the belt teeth in the contact area with the rollers, the ratio between the distances of the pair of rollers from the gears being almost equal to the ratio between the diameters of the gears.

4 Claims, 2 Drawing Figures

TOOTHED BELT DRIVE BETWEEN OBLIQUE SHAFTS

FIELD OF THE INVENTION

The present invention relates to a toothed belt drive to be used between oblique shafts, and particularly between shafts with axes lying in parallel planes and having orthogonal directions.

BACKGROUND OF THE INVENTION

Presently, drives provided with toothed belts are used between gears with parallel rotation axes.

Such a parallelism has very narrow limits to grant the utmost endurance and reliability. This is particularly true at very high revolving speeds of the shafts. In fact, at very high revolving speeds a toothed belt drive between oblique shafts causes the wear of the belt in a very short time, even in the case where the guide rollers are placed on the two branches of the belt. Therefore, drives between oblique or orthogonal shafts up to now have required various complex and expensive kinematic systems.

OBJECT OF THE INVENTION

The present invention provides an improved device which overcomes the aforementioned drawbacks allowing the use of toothed belt drives between oblique shafts even when operating at very high revolving speeds.

SUMMARY OF THE INVENTION

According to the present invention, the toothed belt drive presents the following features:

reaction and guide rollers are located between the gears of the two shafts, acting on the back of the two branches of the belt;

the projection of the axis of each roller on a plane perpendicular to the line joining the middle of the two shafts, has an angular direction substantially intermediate, for each branch of the belt, to that of the immediately preceding shaft and the one of the immediately following shaft;

the roller closest to the smaller gear, in each branch of the belt, has a distance from the aforesaid joining line which is inferior to the radius of said smaller gear;

the projection of the middle of the aforesaid closest roller on the above-mentioned joining line has a distance from the axis of the smaller gear which is inferior or substantially equal to the value of the expression $Ld/(d+D)$, "L" being the distance between the axis of the two gears, "d" and "D" being the length of the diameters of the smaller and the larger gear respectively;

the axis inclination of every roller from a plane perpendicular to the aforesaid joining line is so chosen that the roller axis results lined up with the belt teeth passing on the middle of the roller contact area.

According to a preferred embodiment, the shafts of the two gears are offset from one another by 90°, whereas the angle of the axis of each roller is nearly at 45° with respect to such shafts, there are two reaction and guide rollers and the projection of the middle of the same on the aforesaid joining line has a distance from the smaller gear axis substantially equal to the value of the aforesaid expression.

BRIEF DESCRIPTION OF THE DRAWING

In order that the invention may be better understood, an embodiment thereof will now be described by way of example only and with reference to the accompanying drawings in which.

SPECIFIC DESCRIPTION

Figure 1:
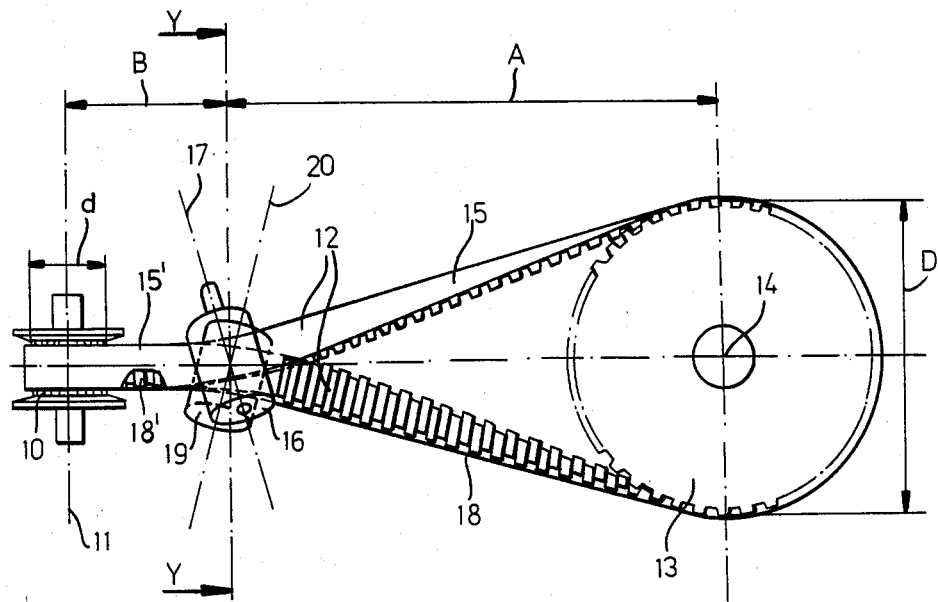
FIG. 1 is a diagrammatic view of a drive with a toothed belt between two gears having orthogonal axes of rotation and two opposite tension rollers.

According to FIG. 1, gear 10, through toothed belt 12, drives the gear 13, whose rotating axis 14 is orthogonal to the driving gear axis 11. Tension roller 16, operating on branch 15—15' of the toothed belt, has the rotation axis 17 almost lined up with the geometric axis 17' of the teeth of such branch, when they pass at the middle of the roller contact area (FIG. 2).

Also tension roller 19, acting on the other branch 18—18' of the toothed belt, has the rotation axis 20 lined up with the geometric axis 20' of the teeth of said branch, when passing at the middle of its contact area.

Figure 2:
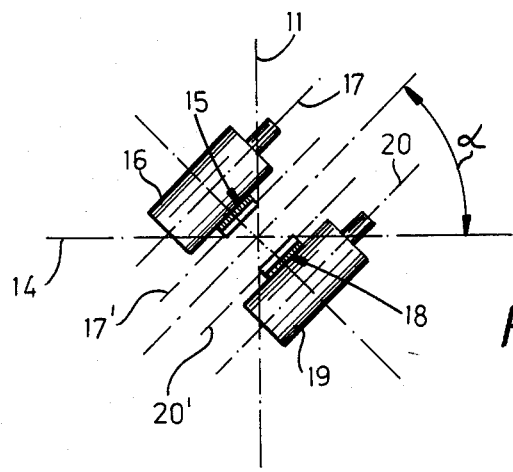
FIG. 2 is a side view of the rollers of FIG. 1, taken respectively in planes passing through the axes of the rollers and perpendicular to the plane of FIG. 1.

As shown in FIG. 2, the projections of axis 17 and 20 on a plane perpendicular to the line joining the middle of the two shafts, form an angle $\alpha$ of about 45° with the projections of axis 11 and 14 on the same plane.

Each roller is opposite to one another and the projection of their middle on the joining line has distances from axis 11–14 whose ratio is almost equal to the ratio existing between the outer diameters of the respective gears. Accordingly, B can be equated to the expression $d(A+B)/(d+D)$.

During the operation, the rotation of gear 10 causes the driving of gear 13 through toothed belt 12. As the two shafts 11 and 14 are orthogonal to each other, the teeth of the belt would tend to move away from the respective teeth of the gears and to assume a determined angularity with respect to the same teeth. Tension roller 16 avoids that and, acting on branches 15 and 15', keeps the teeth of the belt opposite to those of the gears at nearly the same alignment. The tension roller 19 has a similar behavior on the other branches 18 and 18'.

By means of this roller drive, the same "mesh" between toothed belt and the thereby linked gears occurring between parallel shafts is still granted to oblique and orthogonal shafts, without the costly wearing phenomena of the belt. Revolving speeds higher than 20,000 revolutions per minute have been reached without particular inconvenience. This means a remarkable increase of possibilities to use toothed belts with all their advantages of simplicity, saving, noiselessness and reliability.

Naturally, the solution implemented in the above embodiment is subject to modifications, always falling within the scope of the invention. In fact, instead of using a single pair of intermediate rollers 16, 19, more pairs of rollers may be provided. In a case the rollers have to satisfy the conditions pointed out in previous introductory parts of this disclosure.

What is claimed is:

1. A toothed belt drive for acting between a pair of oblique shafts, said drive comprising:
    reaction and guide rollers located between gears of the two shafts and acting on the back of branches of the belt, a projection of an axis of each roller on a plane perpendicular to a line joining the centers of the two shafts has a direction substantially intermediate, for each branch of the belt, to that of the immediately preceding roller or shaft and the one of the immediately following roller or shaft, the roller closest to a smaller gear of said gears, in each branch of the belt, has a distance from the joining line which is less than to the radius of said smaller gear, a projection of the center of said closest roller on the joining line has a distance from an axis of the smaller gear which is inferior or substantially equal to the value of the expression $Ld/(d+D)$, "L" being the distance between the axis of the two gears, "d" and "D" being diameters of the smaller and a larger gear of said gears respectively, the axis of inclination of each roller from said plane perpendicular to the joining line is so chosen that the roller axis is lined up with the belt teeth passing at the center of the roller contact area.

2. The belt drive as defined in claim 1, wherein the reaction and guide rollers are two in number and act respectively on the back of each branch of the belt, the projection of the center of each roller on the joining line having a distance from the smaller gear axis substantially equal to the value of the expression $Ld/(d+D)$.

3. The belt drive as defined in claim 2, wherein the axes of the rollers are so positioned oppositely whereby a straight line joining their centers substantially crosses the line joining the centers of the two gears.

4. The belt drive as defined in claim 3, wherein the projections of the roller axes on a surface orthogonal to the line joining the centers of the gears are parallel to one another.

* * * * *